UNITED STATES PATENT OFFICE.

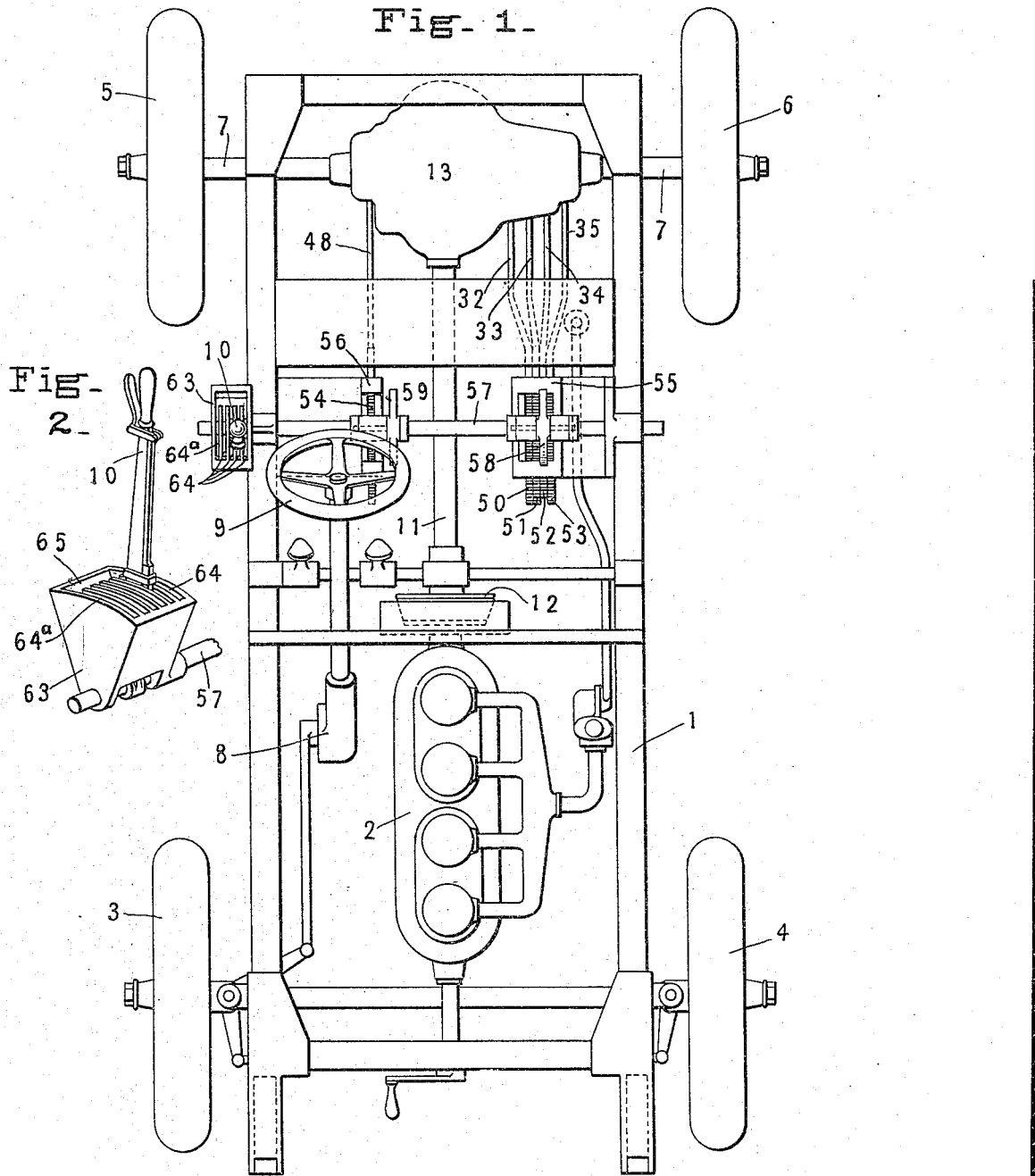

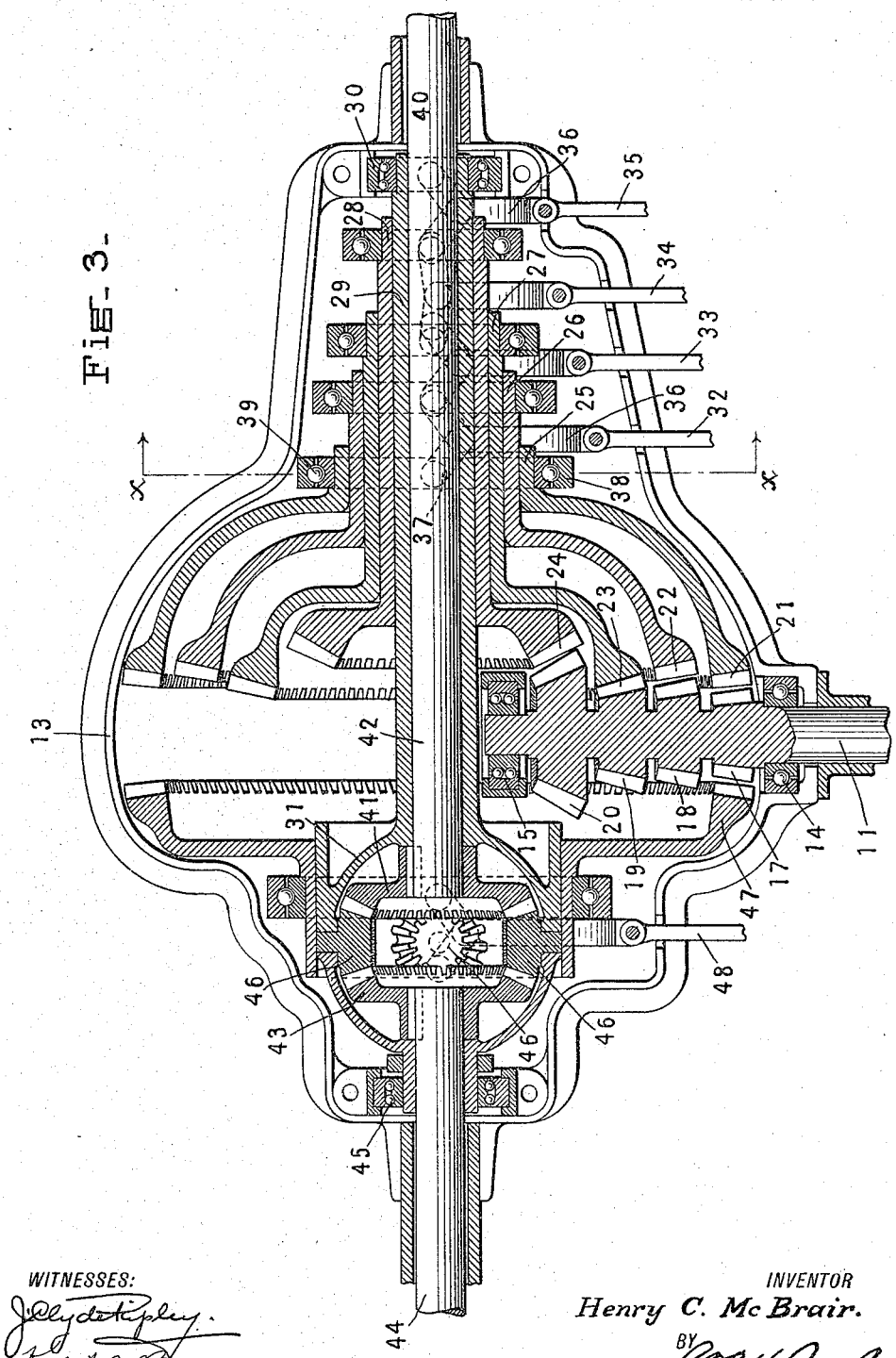

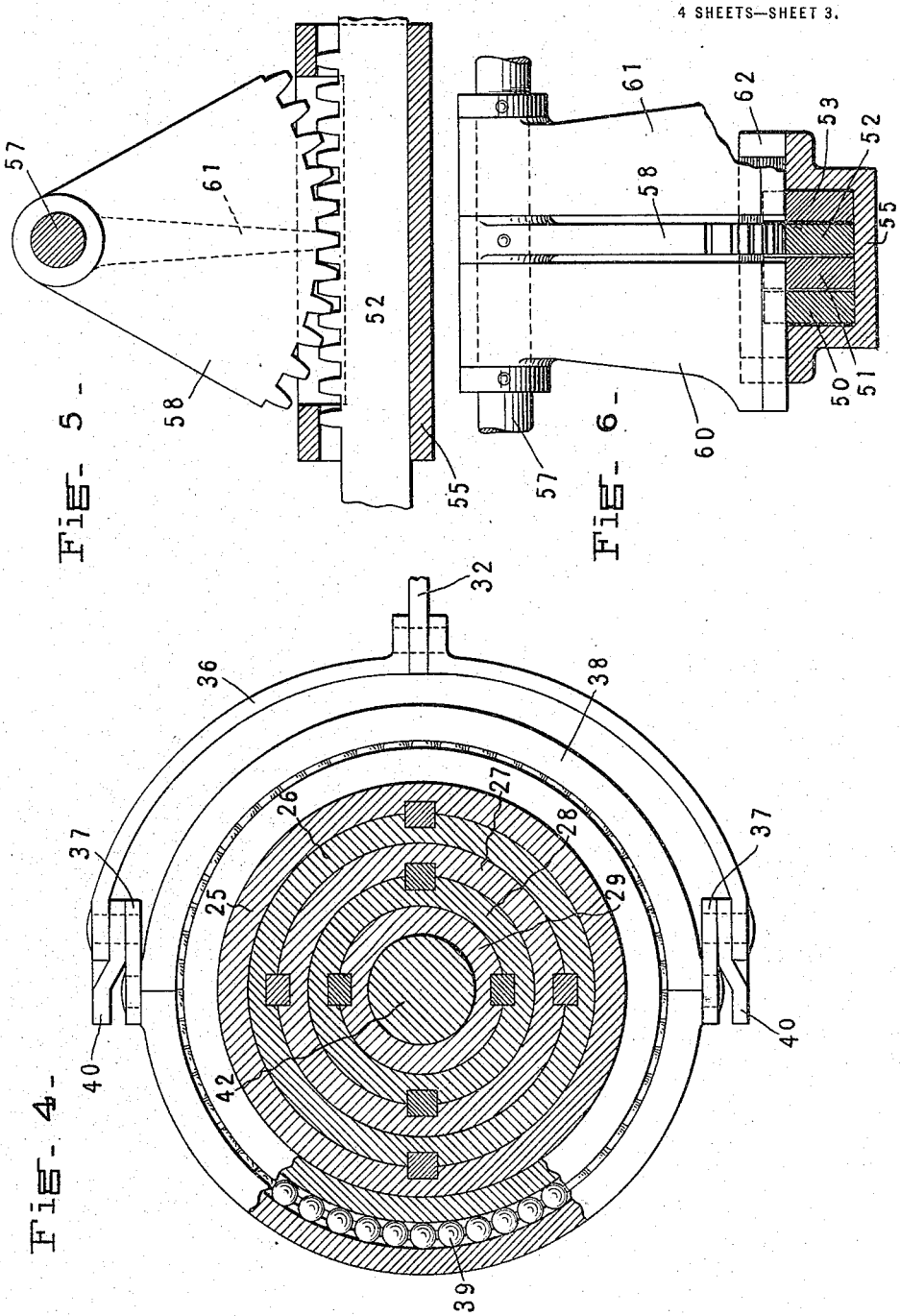

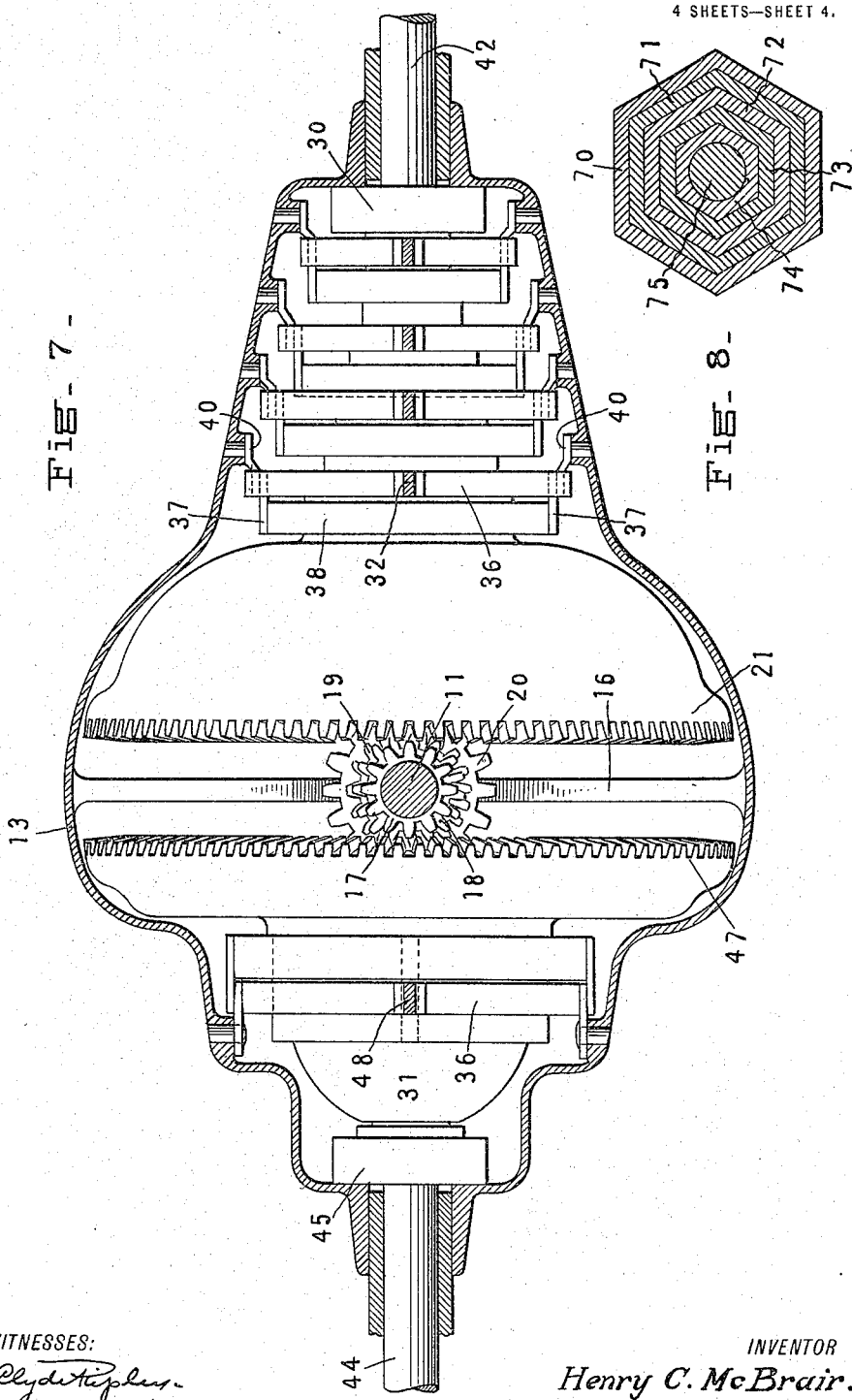

HENRY C. McBRAIR, OF MIDDLETOWN, NEW YORK, ASSIGNOR TO DIRECT DRIVE GEAR COMPANY, OF PATERSON, NEW JERSEY, A CORPORATION OF NEW JERSEY.

VARIABLE-SPEED GEARING.

1,176,766.

Specification of Letters Patent.

Patented Mar. 28, 1916.

Application filed December 22, 1909. Serial No. 534,468.

*To all whom it may concern:*

Be it known that I, HENRY C. MCBRAIR, a citizen of the United States, and a resident of Middletown, in the county of Orange and State of New York, have invented certain new and useful Improvements in Variable-Speed Gearing, of which the following is a full, clear, and exact description, whereby any one skilled in the art may make and use the same.

The invention relates to a variable speed gearing and more particularly to a variable speed gearing in which the relative speed of a driven shaft or shafts may be varied with reference to the speed of rotation of a driving shaft or shafts through the transmission mechanism.

The object of the invention is to provide a simple and compact arrangement in which the various elements may be completely housed in a single structure.

A further object is to provide a simple arrangement whereby the driving shaft may be connected directly with any one of a number of gears upon the driven shaft which, through a differential mechanism, will give proper relative degrees of rotation between the driving and driven shaft sections.

The invention is particularly well adapted for use in connection with shafts substantially at right angles to each other, although the angular position of the shafts may be varied to suit the exigencies of any particular case.

One of the main objects, however, is to provide for direct driving connections between the driving shaft and the driven shaft or shafts through intermeshing gears, so related that the speed of the driven shaft may be varied to that of the driving shaft.

Referring to the drawings: Figure 1 is a plan view of an automobile chassis illustrating the application of the change speed gearing to such a device. Fig. 2 is a perspective view illustrating the controlling handle and the means for controlling its position. Fig. 3 is a sectional view in a horizontal plane through the change speed mechanism, illustrated in Fig. 1. Fig. 4 is a cross-sectional view with parts broken away on the line $x$—$x$ of Fig. 3. Fig. 5 is a partial sectional view through the controlling box illustrating one of the racks and gear segments in elevation. Fig. 6 is a cross-sectional view through the controlling box illustrating the position of the several racks and actuating gear segment. Fig. 7 is a top plan view of the gear parts with the casing broken in section. Fig. 8 is a cross-sectional view illustrating a modified form of bearing for the several gears.

In automobile practice it has been a usual design to employ a driving shaft extending longitudinally of the vehicle from the motor or source of power supply to a change speed gearing and then through connections with the rear axle to drive said axle through bevel gear connections. In some instances, the longitudinal driving shaft is connected with a transverse counter-shaft through the medium of the change speed gearing and bevel gears. The variations in speed between the main shaft and the vehicle wheel has been effected by utilizing a change speed mechanism consisting of various couplets of gears. The most ordinary form is now known as the sliding gear type which is provided with a selective means for throwing either of the several couplets into proper meshing position.

It is one of the principal objects of the present invention to arrange the transmission mechanism as a unit in connection with the driven member whether it be a countershaft or driving axle and control the various gear couplets by a selective means so that the speed ratio may be varied at will or the direction of rotation of the shaft or axle may be reversed.

As shown in the accompanying drawings, the device is illustrated with an automobile where the widest range of speed change and variable conditions of load is well exemplified. In the showing of the drawings, the device is illustrated as embodied in the casing of the driving axle, although obviously, the same mechanism might be used as a countershaft in any desired driving arrangement.

In the drawings the numeral 1, denotes a chassis frame which may be of any ordinary construction, supporting an engine 2, and provided with steering wheels 3, 4, and driving wheels 5, 6, the latter mounted upon a rear axle 7.

The steering wheels are controlled in any suitable manner as by the steering mechanism 8, through the steering wheel 9, and conveniently arranged with reference to said steering wheel is a controlling lever 10, for determining the position of the several gears in the transmission mechanism.

The engine, as illustrated herein, is connected through a main driving shaft 11, having an intermediate clutch 12, with the rear axle through the transmission mechanism hereafter described.

As illustrated in Fig. 3, the driving shaft 11, projects through a casing 13, and is provided with anti-friction bearings 14, 15, the former mounted directly in the casing and the latter supported on a transverse bar 16, extending across the casing as better illustrated in Fig. 7. The shaft 11, is provided with bevel gears 17, 18, 19, 20, arranged to mesh with coöperating driven gears 21, 22, 23, 24. The gear 23, and the driving pinion 19, in Fig. 3, are shown in mesh, all the other gears are out of mesh and consequently out of driving position. The gears 21, to 24, inclusive are of somewhat peculiar form and are provided respectively with hubs 25, 26, 27, 28, of sleeve form fitting one within the other, and successively splined to each other, so that they may have longitudinal axial movement, but must rotate in unison. The innermost gear 24, is likewise splined to a sleeve 29, mounted in suitable anti-friction bearings 30, at one end of the casing 13, and at its opposite end secured to or formed integral with the casing 31, of a balance or differential gearing. The gears 21, to 24, inclusive, are controlled as to their position by actuating rods 32, 33, 34, 35. All of these rods are substantially identical in construction and control the actuating mechanism for the gears, all of which are practically identical in construction. It is only necessary to describe one of said devices, which are best illustrated in Figs. 3, 4 and 7. The rod 32, is pivotally connected with a yoke member 36, which partially encircles the hubs of the gears, and terminates in a toggle connection, one arm of which, 37, is pivoted to a ring 38, of an anti-friction bearing 39, so that the gear 21, may be moved longitudinally of the shaft, without inducing a binding or cramping action with reference to its rotation. The second arm of the toggle lever 40, is conveniently pivoted in the casing 13, and, of course, the inner ends of the levers 37, and 40, are pivoted to the yoke member 36. With this arrangement, a movement of the rod 32, will open or close the toggle arms 37, and 40, and will consequently move the gear 21, either into or out of driving position with reference to its driving gear 17. Thus, by throwing either one of the gears 21 to 24, inclusive, into mesh with the corresponding driving pinions 17, to 20, inclusive, a certain driving effect may be secured upon the sleeve 29, of the differential gearing.

This differential gearing may be of any well known type and as illustrated herein, has one of its gears 41, secured to the shaft section 42, for driving one wheel, while the coöperating gear 43, is secured to the shaft section 44, for driving the second wheel. The differential gear box is mounted in anti-friction bearings 45, within one end of the casing 13, and bears the intermediate pinions 46.

Splined upon the outer surface of the differential casing is the reverse gear 47, which is controlled by a rod 48, through a yoke and toggle mechanism such as described above in connection with the gears 21, to 24, inclusive. This gear 47, may be thrown into or out of mesh with the pinion 17, of the driving shaft 11, through its rod 48, it, of course, being understood that the remaining gears 21, to 24, must be out of driving position whenever the gear 47, is thrown into driving position.

The several controlling rods 32, to 35, inclusive, and 48, are, as shown in Figs. 1, 5 and 6, led forward and connected respectively with racks 50, 51, 52, 53, and 54. The racks 50, to 53, are slidably mounted in a casing 55, while the rack 54, is in a separate casing 56. These several racks, as illustrated, are mounted in the same horizontal plane and below a shaft 57, which is connected and rocked by the controlling lever 10. The shaft 57, is made axially movable and bears actuating gear segments 58, 59, of such a width and so disposed that only one of the racks may be engaged at a time by either of said segments. In order to properly guide the segmental gear and at the same time provide a lock to prevent movement of either or all of the racks, except that which is to be actuated by the segment, locking wings 60, 61, are provided in connection with the segments, and these extend through slots 62, in the sides of the casing 55, within which the sliding racks are mounted.

The operating handle 10, is controlled as to possible movement by a controlling box 63, provided with slots 64, corresponding in number to the several gear changes and opening into a common transverse guideway 65, so that the lever 10, may be shifted to move the shaft 57, axially, whenever said lever is brought backward into the open channel 65. This movement necessitates withdrawing the gear, which is under control from meshing position. The shaft 57, is then shifted to the proper selective point and the segments 58, 59, are moved into a new engaging position with one of the several racks. A forward movement of the lever 10, depresses the toggle of the particular gear selected and causes the engagement of said gear couplet. It will be noted that the parts are so arranged that either one of the racks 50, to 53, inclusive, may be selected for actuation by the lever 10, through the segment 58, and that said segment may be moved backward or forward and may then be rotated to actuate and set in meshing position either of the gears 21, to 24, inclusive. In order to actuate the reverse gear, the segment 59, must be thrown into engagement with the rack 54, by moving the lever 10, to the extreme outside position and moving it forward along the slotted opening 64ª.

It will be seen from the above that there can be no confusion in the selection of any of the gears and no two gears can be placed in meshing position at the same time. Furthermore, it is impossible to throw the mechanism from the forward driving position into a reverse position, without first disconnecting all of the several gears. In Fig. 8, there is illustrated a possible form of sleeve or hub for the several gears which obviates the necessity of splining said hubs to each other and to the sleeve 29, of the balance gear casing. This is effected by making the several hubs or sleeves in hexagonal form and wherein the several hubs are represented as 70, 71, 72, 73, which correspond to the hubs of the gears 21, 22, 23, 24, respectively and the sleeve 74, corresponding to the sleeve 29, with the driving shaft section 75, in the place of cylindrical driving shaft section 42.

Obviously, the various details might be changed and modified to suit the conditions of any particular case and the mechanism might be applied to any driven shaft in place of the rear axle of a vehicle as specifically illustrated. In fact, it is adapted for use with slight changes in its detail arrangement to any mechanism wherein it is desired to vary the speed of a driven member with reference to a driving member.

What I claim as my invention and desire to secure by Letters Patent is:—

1. In a change speed gearing, a supporting casing, a driving shaft projecting thereinto, bearings for said shaft, a plurality of fixed gears on said driving shaft, a sleeve having a bearing in the supporting casing, a divided driven shaft extending through and arranged in the casing and sleeve, a plurality of gears mounted upon said extended sleeve and relatively movable thereon in an axial direction and a separate controlling device for moving each of said gears independently for meshing engagement and disengagement with its respective gear of the driving shaft.

2. In a change speed gearing, a supporting casing, a driving shaft projecting thereinto, a differential gearing having a casing and an extended sleeve, said sleeve and casing having bearings in the supporting casing, a driven shaft mounted in the casing and sleeve of the differential gearing, a plurality of gears mounted upon said extended sleeve and relatively movable thereon in an axial direction, a separate controlling device comprising toggles and a toggle lever for moving each of said gears independently for meshing engagement and disengagement with its respective gear of the driving shaft, said toggles and toggle levers arranged for moving said gears axially of the sleeve and for locking either of said gears in driving position.

3. In a change speed gearing, a main supporting casing, a driving shaft projecting thereinto, bearings for said shaft, a plurality of fixed gears on said driving shaft, a differential gearing having a casing, an extended sleeve, said casing and sleeve having bearings in opposite ends of the main supporting casing, a divided driven shaft extending into said differential casing and sleeve and projecting beyond the main casing, a plurality of gears mounted upon said extended sleeve and relatively movable thereon in an axial direction, a reversing gear mounted upon and axially movable with reference to the differential gear casing and adapted to engage one of the fixed gears of the driving shaft and means including independent toggles and toggle levers for moving and locking either of said gears of the driving sleeve and reversing gear in meshing position with its mating gear upon the driving shaft.

4. In a change speed gearing, a main supporting casing, a driving shaft, a plurality of fixed gears thereon, a two-part driven shaft connected by a differential gearing, an extended sleeve connected with the differential gearing and inclosing the driven shaft, said sleeve having a bearing in the main casing, a plurality of fixed gears mounted upon said driving sleeve, each of said gears having individual axial movement with reference to said sleeve and with reference to each other, individual toggle connections and actuating rods for controlling and locking in position each of said gears, and a single lever for controlling and locking the various toggle connections and appurtenant parts.

5. In a change speed gearing, a main supporting casing, a driving shaft, a plurality of gears fixed thereon, a two-part driven shaft having its parts joined by a differential gearing, a casing connected with the differential gearing and encircling the two-part shaft, said casing having extended sleeves provided with bearings in the opposite ends of the supporting casing, a plurality of gears mounted on said driving sleeve and axially movable thereon, a gear axially movable and mounted upon the differential gear casing, and individual toggle devices for each of said gears, operatively connected thereto and connected with a controlling lever, said lever and toggle devices adapted to move said gears axially into and out of meshing position with the fixed gear of the driving shaft and adapted to lock either of said gears in engagement with its mating gear in a definite sequence of movements.

6. In a change speed gearing, a main supporting casing, a driving shaft, a plurality of gears fixed thereon and fixed with reference to each other, a two-part driven shaft transversely arranged to the driving shaft and extending through the casing, a plurality of concentrically arranged gears located on opposite sides of the fixed gears of the driving shaft, a casing inclosing the driven shaft and containing a differential gear mechanism, said casing having extended sleeves provided with bearings in the main casing, a plurality of gears mounted upon the sleeve and axially movable thereon and axially movable with reference to each other, and locking devices and operative connections therefor adapted for shifting and holding in mesh either of the gears of the driven shaft with its corresponding mating gear of the driving shaft, said locking devices embodying toggles or toggle levers for each of said gears, and a single actuating lever common to all of said toggle levers.

HENRY C. McBRAIR.

Witnesses:
 KATE BRENNER,
 WM. B. HILL.

Copies of this patent may be obtained for five cents each, by addressing the "Commissioner of Patents, Washington, D. C."